(12) United States Patent
Srivastava et al.

(10) Patent No.: US 7,529,744 B1
(45) Date of Patent: May 5, 2009

(54) SEARCH INTERFACE SERVER AND STORAGE MANAGEMENT

(75) Inventors: Sharad Srivastava, San Jose, CA (US); Darshan B. Joshi, Fremont, CA (US)

(73) Assignee: Symantec Corporation, Cupertino, CA (US)

( * ) Notice: Subject to any disclaimer, the term of this patent is extended or adjusted under 35 U.S.C. 154(b) by 411 days.

(21) Appl. No.: 11/171,952

(22) Filed: Jun. 30, 2005

(51) Int. Cl.
*G06F 7/10* (2006.01)
*G06F 17/30* (2006.01)
*G06F 17/27* (2006.01)

(52) U.S. Cl. .............................................. 707/5; 707/3
(58) Field of Classification Search ...................... 707/5, 707/3; 709/226
See application file for complete search history.

(56) References Cited

U.S. PATENT DOCUMENTS

| | | | |
|---|---|---|---|
| 5,602,991 A * | 2/1997 | Berteau | 709/227 |
| 6,523,028 B1 * | 2/2003 | DiDomizio et al. | 707/5 |
| 6,615,201 B1 * | 9/2003 | Seshadri et al. | 707/2 |
| 6,920,468 B1 * | 7/2005 | Cousins et al. | 707/203 |
| 2002/0147709 A1 * | 10/2002 | Rajarajan et al. | 707/3 |
| 2004/0054984 A1 * | 3/2004 | Chong et al. | 717/103 |
| 2005/0198068 A1 * | 9/2005 | Mukherjee et al. | 707/104.1 |
| 2005/0234972 A1 * | 10/2005 | Zeng et al. | 707/103 R |

OTHER PUBLICATIONS

"Google Desktop Search SDK Developer Guide," Internet, downloaded Jun. 6, 2005, http://desktop.google.com/developerguide.html.

* cited by examiner

*Primary Examiner*—John E Breene
*Assistant Examiner*—Patrick E Sweeney
(74) *Attorney, Agent, or Firm*—Meyertons Hood Kivlin Kowert & Goetzel, P.C.; B. Noël Kivlin (57) ABSTRACT

A system, method, and computer-accessible medium for searching in a server management system are disclosed. One or more search terms are determined. A search is performed for object definitions which match the search terms, thereby determining one or more matching objects corresponding to the object definitions which match the one or more search terms. The matching objects are reported.

21 Claims, 9 Drawing Sheets

SEARCH INTERFACE SERVER AND STORAGE MANAGEMENT

BACKGROUND

1. Field of the Invention

This invention relates to server and storage management and, more particularly, to searching in a server management environment.

2. Description of the Related Art

Enterprise computing environments are increasingly characterized by the heterogeneity of their storage systems, server hardware, network infrastructure elements, application software, and operating systems. For example, storage devices in a network may include different types of devices having different storage models and storage capacities. As the number of vendors responsible for the elements of the enterprise computing environment grows, so too does the complexity of system administration.

Managing individual servers in a heterogeneous storage environment is increasingly difficult as the environment scales in size and complexity. Each server may demand configuration and maintenance of its operating system, application software, storage, network connections, and other resources. Appropriate user interfaces may centralize the management of servers and their associated resources in a single management console.

Typically, these management interfaces use a hierarchical, "drill-down" approach. To reach a particular object in a hierarchical interface, the user (e.g., the system administrator) may be required to descend from the root level through many successive levels of the hierarchy. In order to find a particular object using the hierarchical interface, the user may also be required to know the exact identity and location of the target object in the hierarchy. If this knowledge is not readily available, the usefulness of the hierarchical interface is compromised. Furthermore, if the target object exists in more than one context, the hierarchical interface may not provide a convenient way to switch from one context to another. It is therefore desirable to provide improved systems and methods for managing servers and their associated resources.

SUMMARY

A system, method, and computer-accessible medium for searching in a server management system are disclosed. The method may include determining one or more search terms. The search terms may be intended to describe one or more objects across a plurality of managed entities in the server management system. The method may further include performing a search for object definitions which match the search terms, thereby determining one or more matching objects corresponding to the object definitions which match the one or more search terms. The method may also include reporting the matching objects.

The search terms may be received from user input, such as user input entered into a search interface window. The search terms may be entered using alphanumeric entry, menus, checkboxes, and/or other interface elements. In one embodiment, the search terms may be automatically suggested based on initial search terms entered by the user.

In one embodiment, the matching objects may be reported in the search interface window. The matching objects may be displayed in a logical order, e.g., by context. In one embodiment, each matching object may be displayed in the search interface window for each context in which it occurs.

In one embodiment, the server management system may use an external search engine for tasks such as searching and index maintenance. A plug-in may provide specific logic for using the search engine to search across the managed entities in the server management system. The user interface (i.e., the "look and feel") may be provided by the search engine. The search interface may include a front end, such as a web browser, which is executed locally on the management server to display the user interface provided by the search engine.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
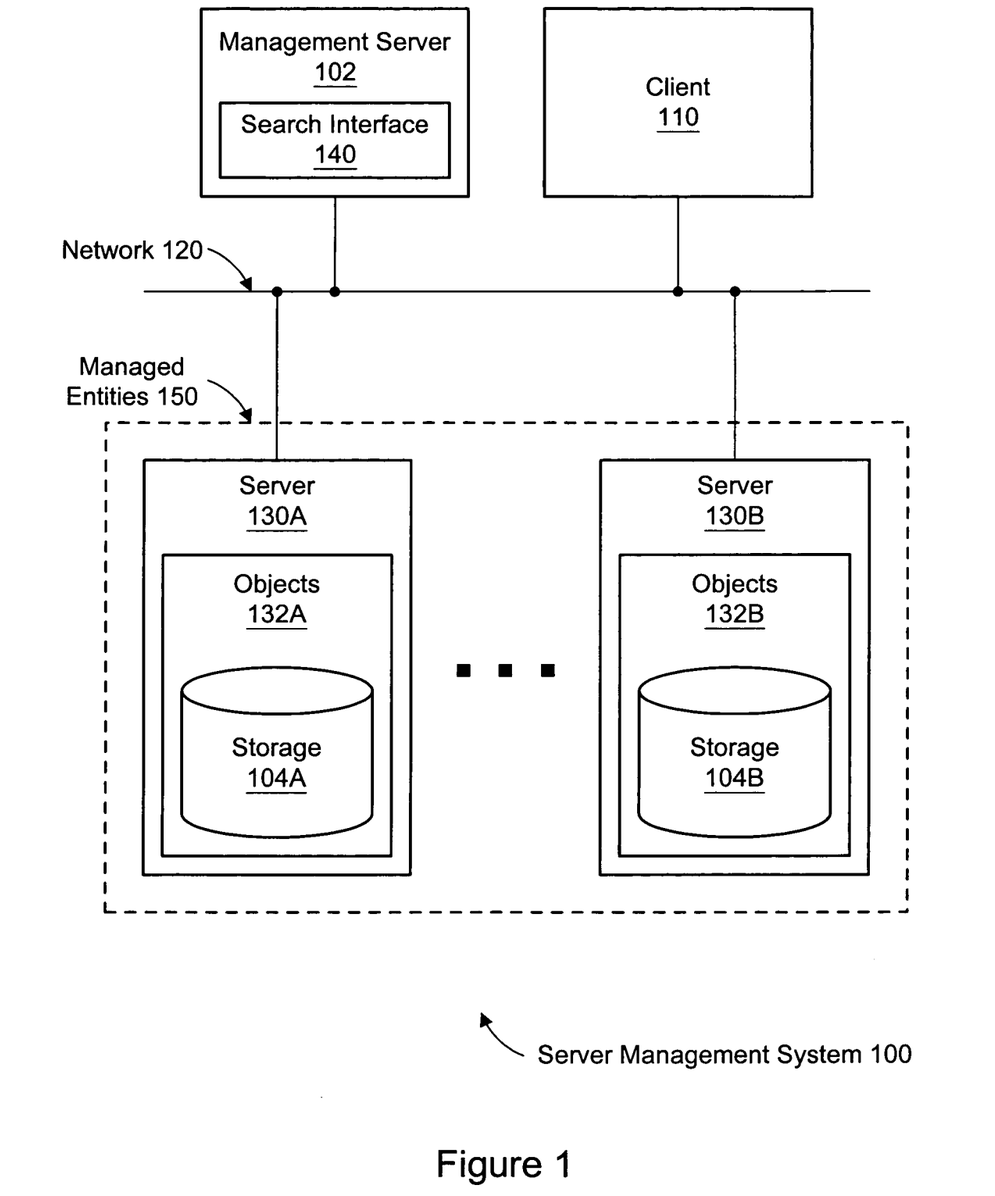
FIG. 1 illustrates a server management system including a search interface for objects in a plurality of managed entities according to one embodiment.

FIG. 1 illustrates a server management system 100 including a search interface 140 for objects in a plurality of managed entities 150 according to one embodiment. The search interface 140 running on a management server 102 may be used to quickly locate an object of interest in the server management system 100. The search interface 140 may display the located objects in a user-friendly and logical format. In one embodiment, the search interface 140 may allow the user (e.g., the system administrator) to choose among the various contexts in which the target object may appear. The search interface 140 may allow the user to view various attributes of an object. The management server 102 may further allow the user to manipulate or perform various administrative actions on an object discovered using the search interface 140.

For purposes of illustration, FIG. 1 shows a basic set of elements in one embodiment of a server management system 100. The example shown in FIG. 1 is intended to be illustrative rather than limiting, and other embodiments are possible and contemplated. As used herein, the term "server management system" includes any system usable for management, configuration, or maintenance of one or more servers and their associated resources (e.g., operating system software, application software, storage resources, network resources, etc.). As used herein, the terms "server management" and "server management system" may include cluster management, storage management, or a system configured thereto. In various embodiments, the server management system 100 may employ any of a number of commercially available software products, such as, for example, the VERITAS Cluster Server product or the VERITAS OpForce product, both available from VERITAS Software Corporation (Mountain View, Calif.). The server management system 100 may include a management server 102 and one or more managed entities 150 coupled by a network 120 (e.g., a LAN or WAN according to various network topologies). In the example shown in FIG. 1, the managed entities include two servers 130A and 130B (herein referred to collectively as servers 130). In one embodiment, the server management system may also include one or more clients 110 which consume resources provided by the servers 130.

The managed entities 150 may include various objects 132A and 132B (herein referred to collectively as objects 132). As used herein, the term "object" includes any element or resource which can be managed, configured, or maintained by the server management system 100. For example, the objects may include storage resources 104A and 104B (herein referred to collectively as storage 104). In various embodiments, the storage 104 may be implemented using substantially any kind of storage device and configuration, including a hard disk, a tape drive, an optical storage device, storage array, SAN-based storage, NAS-based storage, and other suitable storage devices and configurations. Other examples of objects may include instances of operating system (OS) software, instances of application software, internal elements within the OS and application software, elements of stored data, elements of system hardware (e.g., memory resources), elements of the network 120 (e.g., fabric switches, network interfaces), and groups or classes of any of the above.

Each object in the server management system 100 may have a corresponding definition. The object definitions may comprise various elements of metadata such as names of objects, attributes and values of objects, locations of objects, classes or groups to which objects belong, relationships of objects to other objects, ownership and access privileges of objects, and any other metadata which suitably characterizes objects. In one embodiment, the object definitions may also be considered to include various forms of aggregated data such as message logs, reports, configuration information, summarizations, and other forms of metadata associated with the objects. The definitions may be generated automatically (e.g., on installation or configuration of the object), manually (e.g., by input from the system administrator), or any combination thereof. In one embodiment, the definitions may be maintained by the management server 102, e.g., in a metadata database for the managed entities 150.

Figure 2:
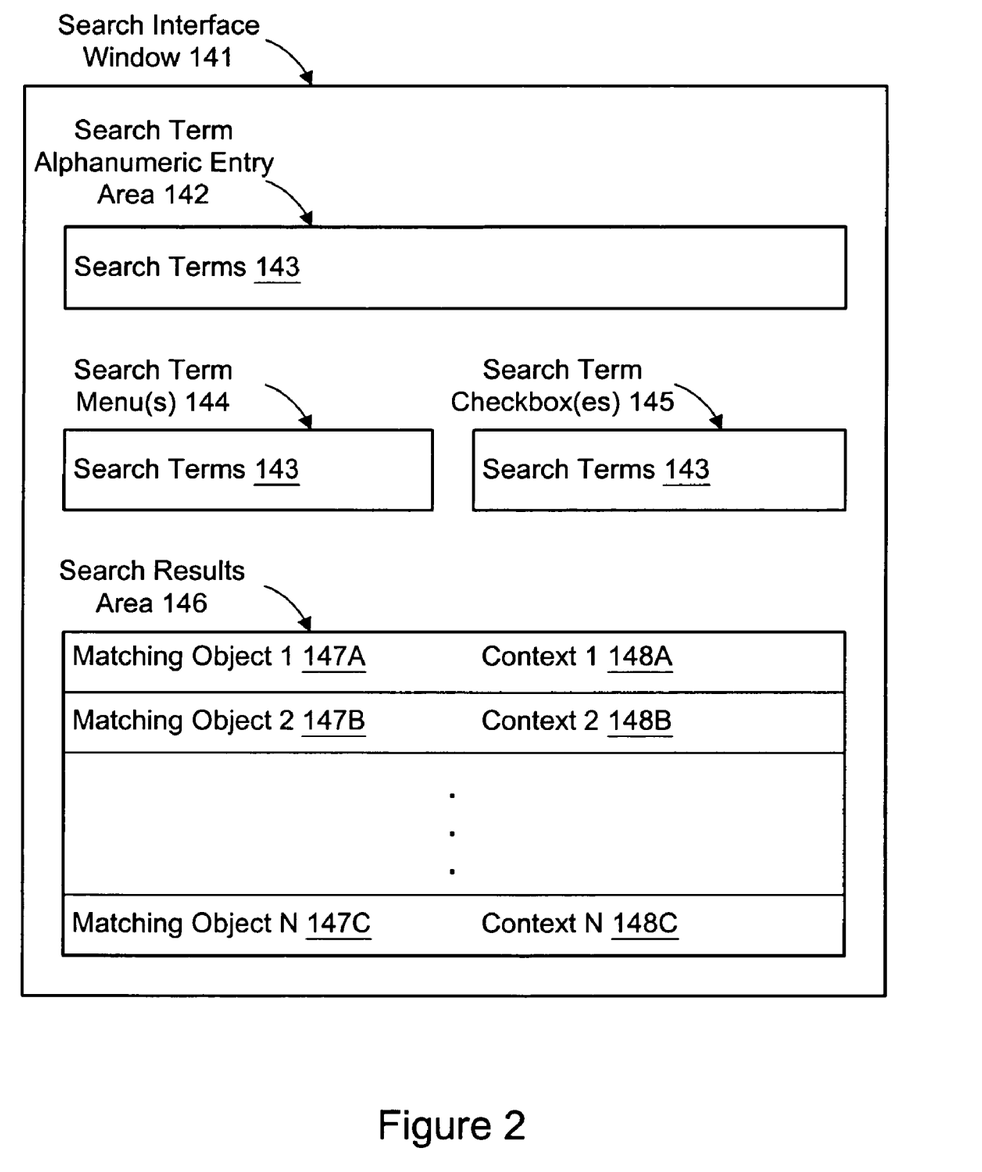
FIG. 2 illustrates a search interface window for searching a server management system according to one embodiment.

FIG. 2 illustrates a search interface window 141 for searching a server management system according to one embodiment. The example window shown in FIG. 2 is intended to be illustrative rather than limiting, and other embodiments are possible and contemplated. The search interface window 141 may be generated by the search interface 140 for entry and display of search-related data (e.g., search terms and search results). As will be described in greater detail below, search terms 143 may be entered into the search interface window 141 in a variety of ways. The search terms 143 may be used to determine any matching objects 147 which may then be displayed in a search terms result area 146 of the search interface window 141. By using search terms 143 in this manner, the user may be substantially liberated from the requirement of knowing the exact identity and location of a target object among the managed entities 150.

Figure 3:
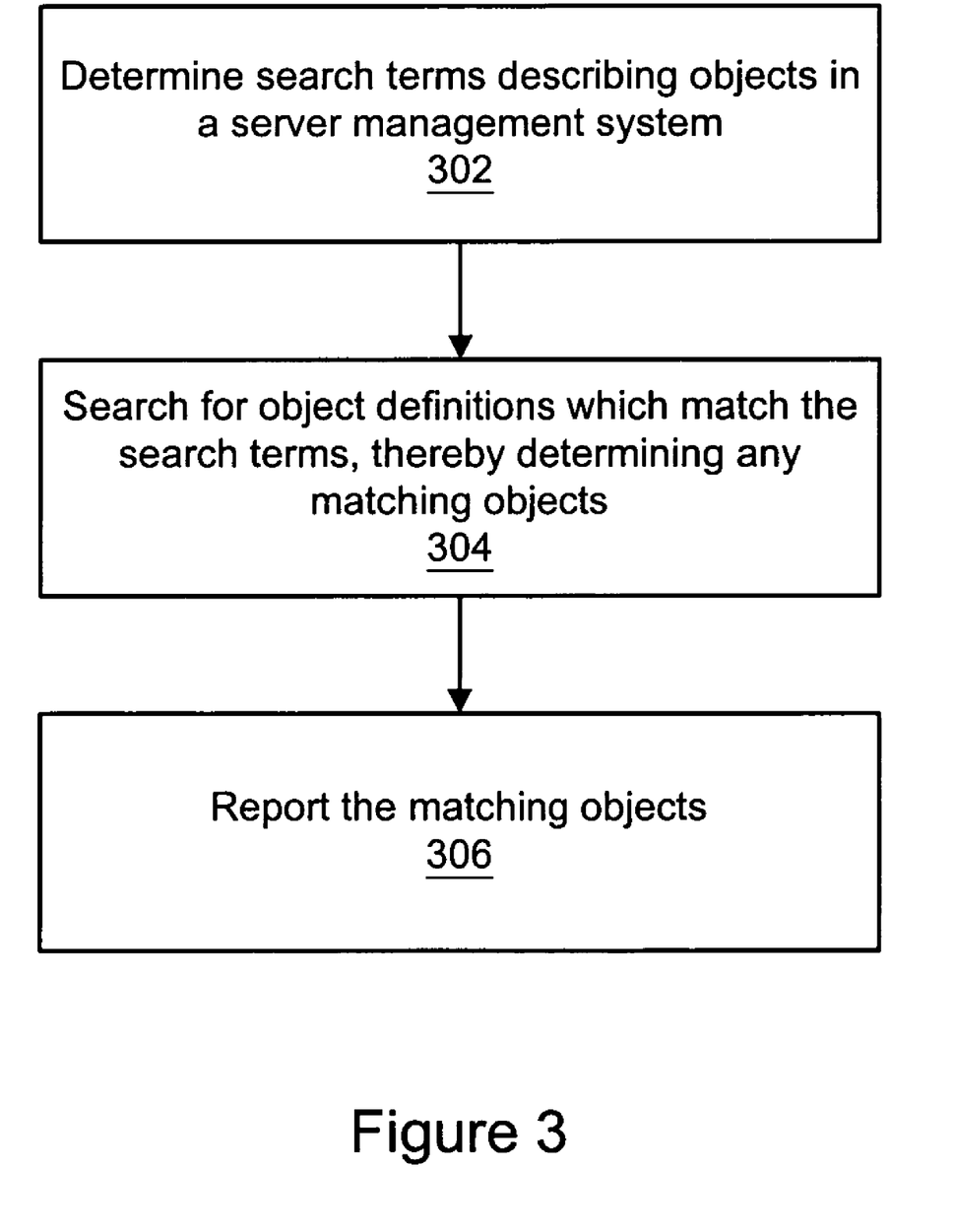
FIG. 3 is a flowchart illustrating a method for searching a server management system according to one embodiment.

FIG. 3 is a flowchart illustrating a method for searching a server management system according to one embodiment. Blocks that are implemented in software may represent a plurality of instructions comprising the software which, when executed on a suitable computer system, perform the function(s) described for the blocks. One or more search terms 143 are determined in 302. The search terms may be intended to describe one or more objects in a server management system. For example, the search term "Oracle" may be intended to describe any objects related to the database products available from Oracle Corporation of Redwood Shores, Calif.

The search may be initiated by a user or by another program. In one embodiment, the search terms 143 may be received by one program, process, or thread from another program, process, or thread. For example, one program may send an HTML request including the search terms 143 to the search interface 140 to initiate the search. The HTML request may be structured in a form such as "http://search-interface/search?searchterm1+searchterm2+searchterm3." In one embodiment, the search terms 143 may be generated automatically, e.g., by a software program which implements an appropriate algorithm or heuristic. For example, search terms 143 may be generated automatically based on a particular computing context in which the search is initiated.

In one embodiment, the search terms 143 may be received from user input, such as user input entered into a search interface window 141. In various embodiments, user input may be entered in a variety of ways. In one embodiment, a user may type one or more search terms 143 into a search term alphanumeric entry area 142. In one embodiment, a user may enter one or more search terms 143 by selecting one or more items from one or more search term menus 144. In one embodiment, a user may enter one or more search terms 143 by selecting one or more search term checkboxes 145. The menu(s) 144 and checkbox(es) 145 may include a pre-determined set of potential choices, such as commonly used search terms, for the convenience of the user. Various embodiments may include different combinations of ways to accept user entry of search terms 143. Various embodiments may further combine user entry of search terms 143 with automatic generation of search terms 143. Various embodiments may implement particular grammars for the search terms 143, e.g., to determine whether whitespace between two typed search terms implicitly means "and" or "or." For the further convenience of the user, additional interface options may be used to broaden or limit the scope of the search in one embodiment.

In 304, a search is performed for object definitions which match the search terms 143. As described above, each object in the server management system 100 may have a corresponding definition which comprises descriptive metadata. The definitions may be kept in an index for efficient searching. For each definition, the index may further comprise the location of the corresponding object in the server management system 100 or a way to reach the corresponding object. The search performed in 304 may determine any matching objects corresponding to the object definitions which match the one or more search terms. For example, a search for the search term "Oracle" may find substantially all instances, service groups, resources, agents, types, attributes, etc., related to Oracle® across all managed entities. A search for the search terms "Oracle" and a particular department or campus of an organization may return only those Oracle® objects which are defined with respect to the particular department or campus (e.g., objects which are hosted at the department or campus). A more specific search for a name or status of a particular instance, process, resource, attribute, or value may accordingly determine the matching object(s). For example, a search for the search terms "volume" and "MonitorTimeout" may find attribute-value pairs for the MonitorTimeout attribute for all resources of type "volume." In one embodiment, the definitions which are searched may include aggregated data such as reports, logs, and other data associated with the objects and/or characterizing the objects.

Searches may be conducted in a structured, unstructured, or hybrid manner. In a structured search, the search terms are applied to specific attributes or parameters of objects. An example of a structured search may include the search terms "location=Houston volume=V1." The structured search in this example may return only objects for which the location is "Houston" and the volume identifier is "V1." In an unstructured search, the search terms are not necessarily associated with any particular attributes or parameters of objects. An example of an unstructured search may include the search terms "Houston V1." The unstructured search in this example may return any objects having definitions that include "Houston" or "V1" (or Houston and V1, depending upon the search grammar), even if "Houston" is not the location of the object or "V1" is not a volume identifier. To mitigate the effects of unexpected or inappropriate results, the matching objects in an unstructured search may be ordered by relevance. A hybrid search may include both structured and unstructured search terms. An example of a hybrid search may include the search terms "location=Houston V1." The hybrid search in this example may return objects whose location is "Houston" and/or whose definitions include the string "V1."

In 306, the matching objects are reported or otherwise returned to the source which requested the search. In one embodiment, the search results may include an HTML link or other suitable address for each matching object. In one embodiment, the matching objects may be reported in the search interface window 141. For example, matching objects 147A, 147B, and 147C (herein referred to collectively as matching objects 132) may be displayed in a search results area 146 of the search interface window 141. The matching objects 132 returned by the search may be displayed in a logical order. For example, the objects may be grouped with server management objects at the top and storage management objects at the bottom. In one embodiment, the matching objects 147 may be sortable based on various criteria (e.g., sorted alphabetically, sorted by context, sorted by status, etc.).

In one embodiment, certain objects in the server management system 100 may occur in a plurality of contexts. For example, the server management system 100 may include contexts such as server management, storage management, cluster management, file system management, volume management, etc. Each matching object may be displayed in the search interface window 141 with a particular context. For example, a first matching object 147A may be displayed with a first context 148A, a second matching object 147B may be displayed with a second context 148B, and an Nth matching object 147C may be displayed with an Nth context 148C. The search interface window 141 may permit the user to switch between different contexts in a convenient manner. In one embodiment, each object-context pair may be listed as a distinct matching object 147 and context 148. In one embodiment, the objects in a given context may be grouped together. By navigating to a different context (e.g., by scrolling up or down in the search results area 146), the user may view all the objects in that particular context.

In one embodiment, the user may select a matching object 147 in the search interface window 141 for further management. For example, the user may choose to view additional information or perform an action on a selected matching object 147. Actions may include, for example, server and storage management tasks supported by the server management system 100. In one embodiment, the user may select and perform an action on one of the matching objects in a particular selected context. The matching object 147 may be located among the managed entities 150 using location information stored for the corresponding definition in the search index or stored elsewhere in the server management system 100. For example, the HTML link or other address associated with the matching object 147 may be used to locate the object among the managed entities 150.

Figure 4:
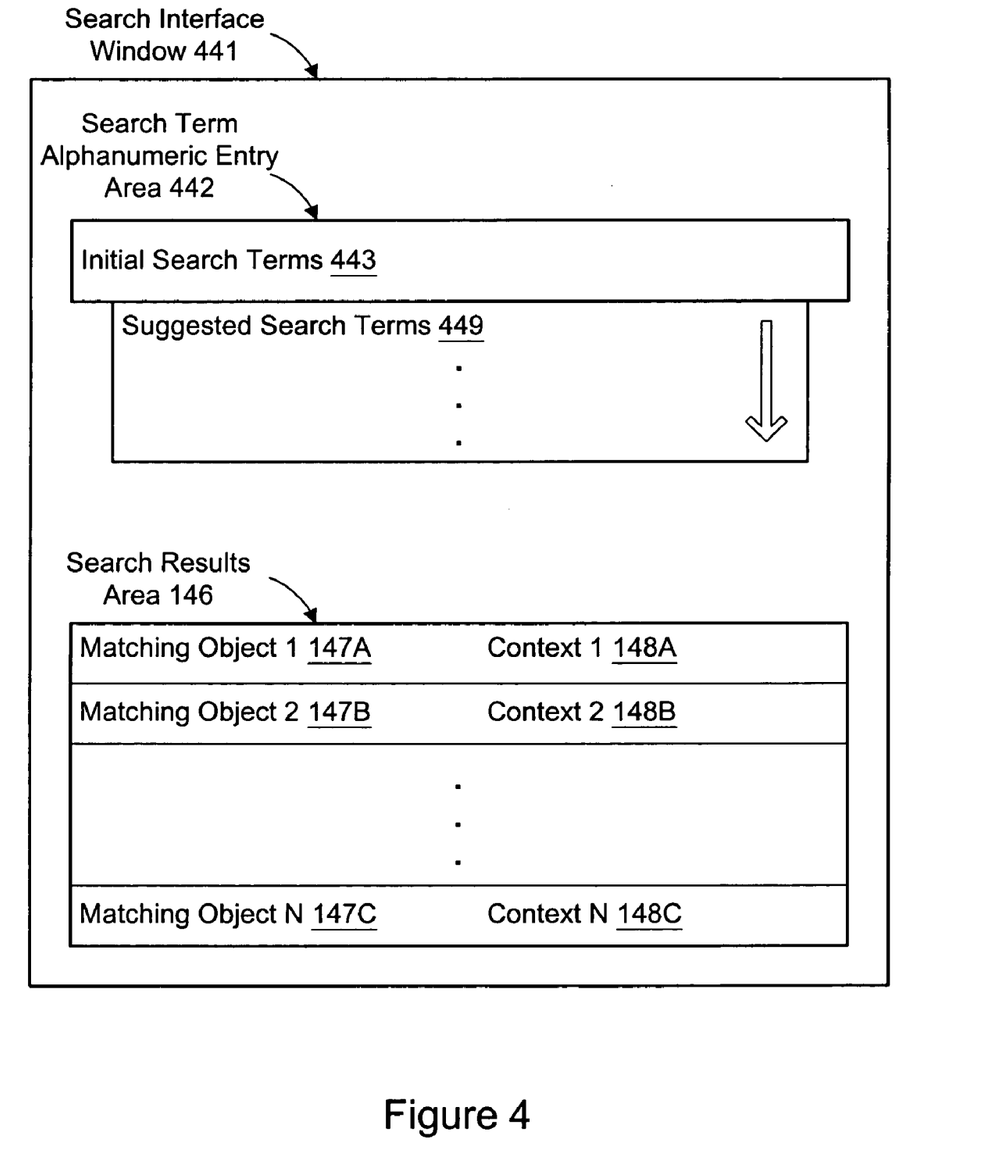
FIG. 4 illustrates a search interface window including suggested search terms according to one embodiment.
Figure 5:
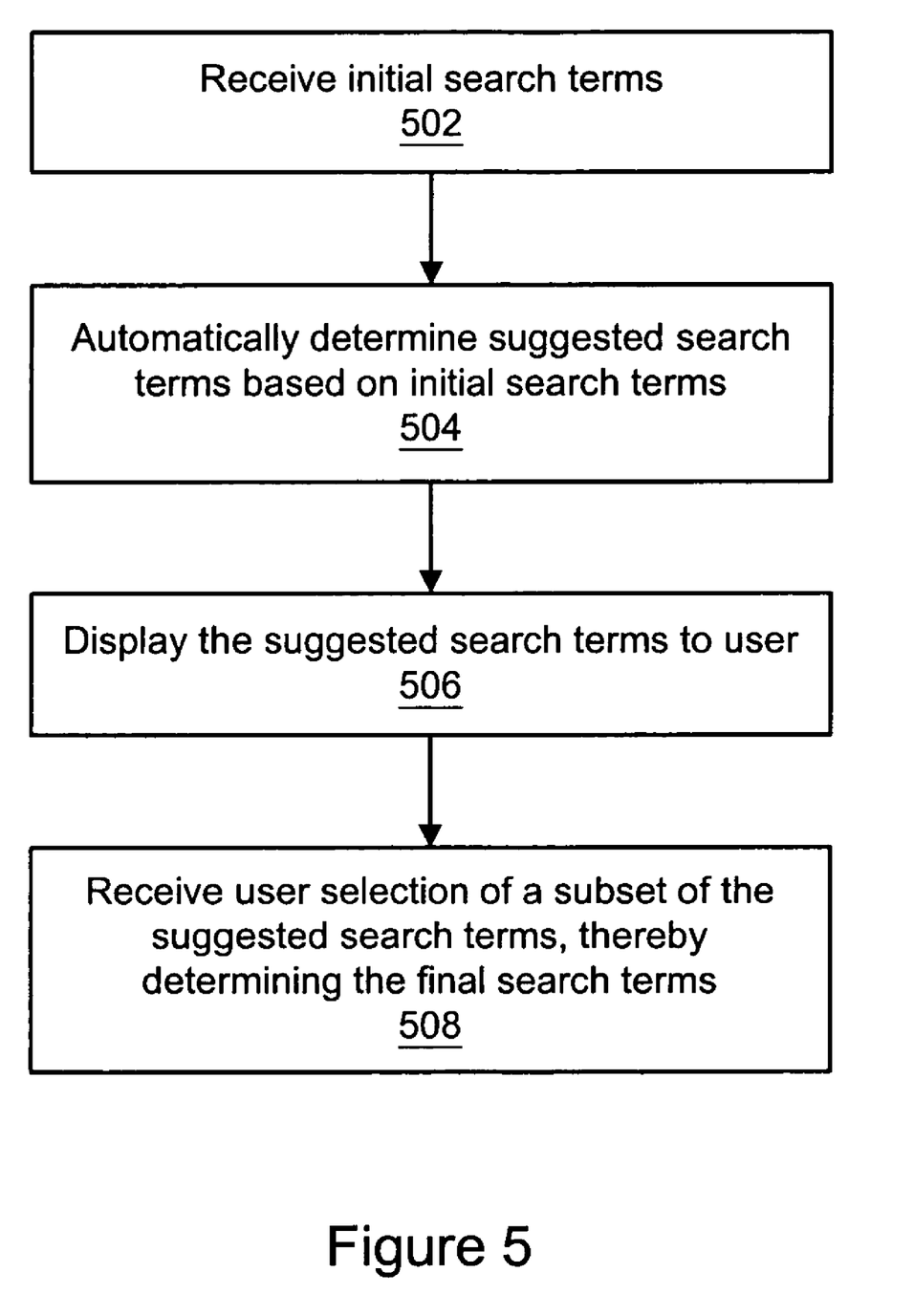
FIG. 5 is a flowchart illustrating a method for searching a server management system using automatically suggested search terms according to one embodiment.

In one embodiment, search terms may be suggested by the server management system 100 in response to user input. FIG. 4 illustrates a search interface window 441 including suggested search terms 449 according to one embodiment. FIG. 5 is a flowchart illustrating a method for searching a server management system using automatically suggested search terms according to one embodiment. Blocks that are implemented in software may represent a plurality of instructions comprising the software which, when executed on a suitable computer system, perform the function(s) described for the blocks.

In 502, one or more initial search terms 443 are received. In one embodiment, the user may enter the initial search terms 443 in a search term alphanumeric entry area 442. The initial search terms 443 may comprise alphanumeric data. The initial search terms 443 may comprise a complete or incomplete word or series of words such as "Orac" or "Oracle."

In 504, one or more suggested search terms 449 are automatically determined in response to receiving the one or more initial search terms 443 in 502. Using an appropriate algorithm or heuristic, the suggested search terms 449 may be generated based on various criteria. The presence of incomplete words in the initial search terms 443 may result in the suggestion of complete words based on commonly used search terms. The suggested search terms 449 may be based on the initial search terms 443 and the authenticated role of the user. For example, if the user is an administrator of a particular instance of an Oracle® database product, that instance of the Oracle® database product may be suggested in response to entry of the initial search terms 449 "Orac" or "Oracle." The suggested search terms 449 may be based on the frequency of prior operations (e.g., searches and management tasks) on specific objects, the frequency of prior operations on object types, the frequency of prior events (e.g., faults) on specific objects, and/or the frequency of prior events on object types.

In 506, the one or more suggested search terms 449 are displayed to a user. In one embodiment, the suggested search terms 449 may be displayed in a "drop-down" menu below the search term alphanumeric entry area 442. The suggested search terms 449 may be grouped in order of priority. For example, objects having a greater frequency of prior operations may be listed before objects having a lesser frequency of prior operations. Using appropriate input techniques, the user may choose a subset (typically one) of the suggested search terms 449. The user may also opt to ignore the suggested search terms 449. In 508, the user selection of a subset of the one or more suggested search terms is received, thereby determining the one or more final search terms 143 to be used in the search. The final search terms 143 may be displayed in the search term alphanumeric entry area 442, replacing the initial search terms 443. A search may then be conducted as discussed with reference to FIG. 3.

Figure 6:
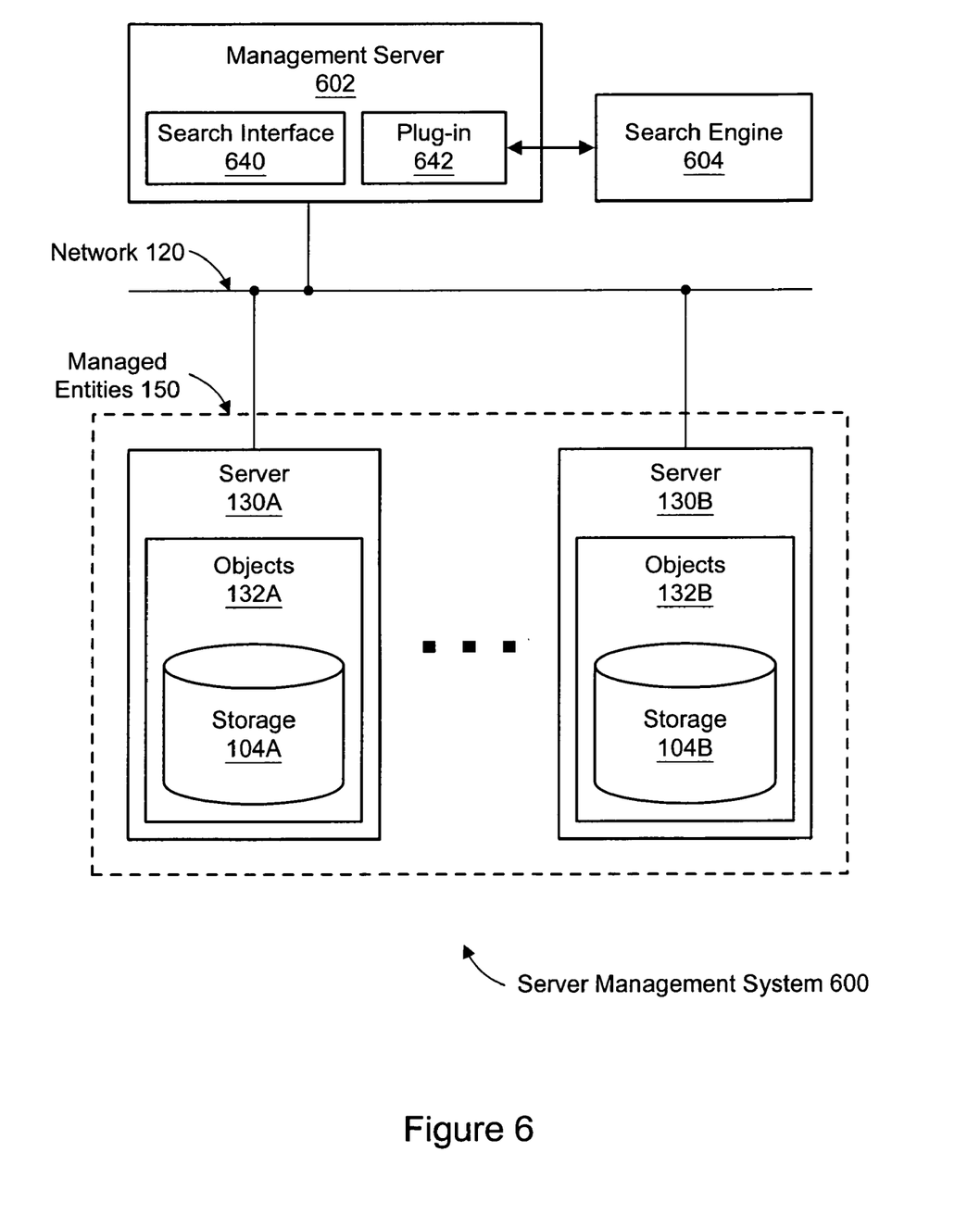
FIG. 6 illustrates a server management system including a search interface and a search engine according to one embodiment.

In one embodiment, the server management system may use an external search engine for tasks such as searching and index maintenance. FIG. 6 illustrates a server management system 600 including a local search interface 640 and a search engine 604 according to one embodiment. In one embodiment, the user interface (i.e., the "look and feel") may be provided by the search engine 604. The search interface 640 may include a front end, such as a web browser, which is executed locally on the management server 602 to display the user interface provided by the search engine 604. In this manner, the management server 602 may present the user with a familiar user experience.

A plug-in 642 may provide specific logic for using the search engine 604 to search the managed entities 150 in the server management system 600. For example, the plug-in 642 may translate the object definitions and other metadata maintained by the management server 602 into an appropriate form for use in the indexing mechanism of the search engine 604. The plug-in 642 may send the translated metadata to the search engine 604 for storage and/or indexing. The plug-in 642 may also send search queries to the search engine 604 and receive search results from the search engine 604.

Various products may be used as the search engine 604. In one embodiment, for example, the search engine 604 comprises the Google™ Desktop Search product available from Google of Mountain View, Calif. In other embodiments, other third-party search engine products may be used. In yet other embodiments, open-source search engines may be used with or without substantial modification in the server management system 600.

The plug-in 642 may communicate with the search engine 604 using application programming interfaces (APIs) exposed by the search engine 604. In an embodiment using the Google™ Desktop Search product as the search engine 604, the APIs may be used to construct and send event objects which encapsulate object definitions and other metadata. Allowed event types and their properties may be specified by event schemas. The APIs may be used by the plug-in 642 to register to receive notifications from the search engine 604 and its crawler. The APIs may be used by the plug-in 642 to send the search terms 143 to the search engine 604 using HTTP or other appropriate protocols. The APIs may also be used by the plug-in to receive search results from the search engine 604 using XML or other appropriate formats.

Figure 7:
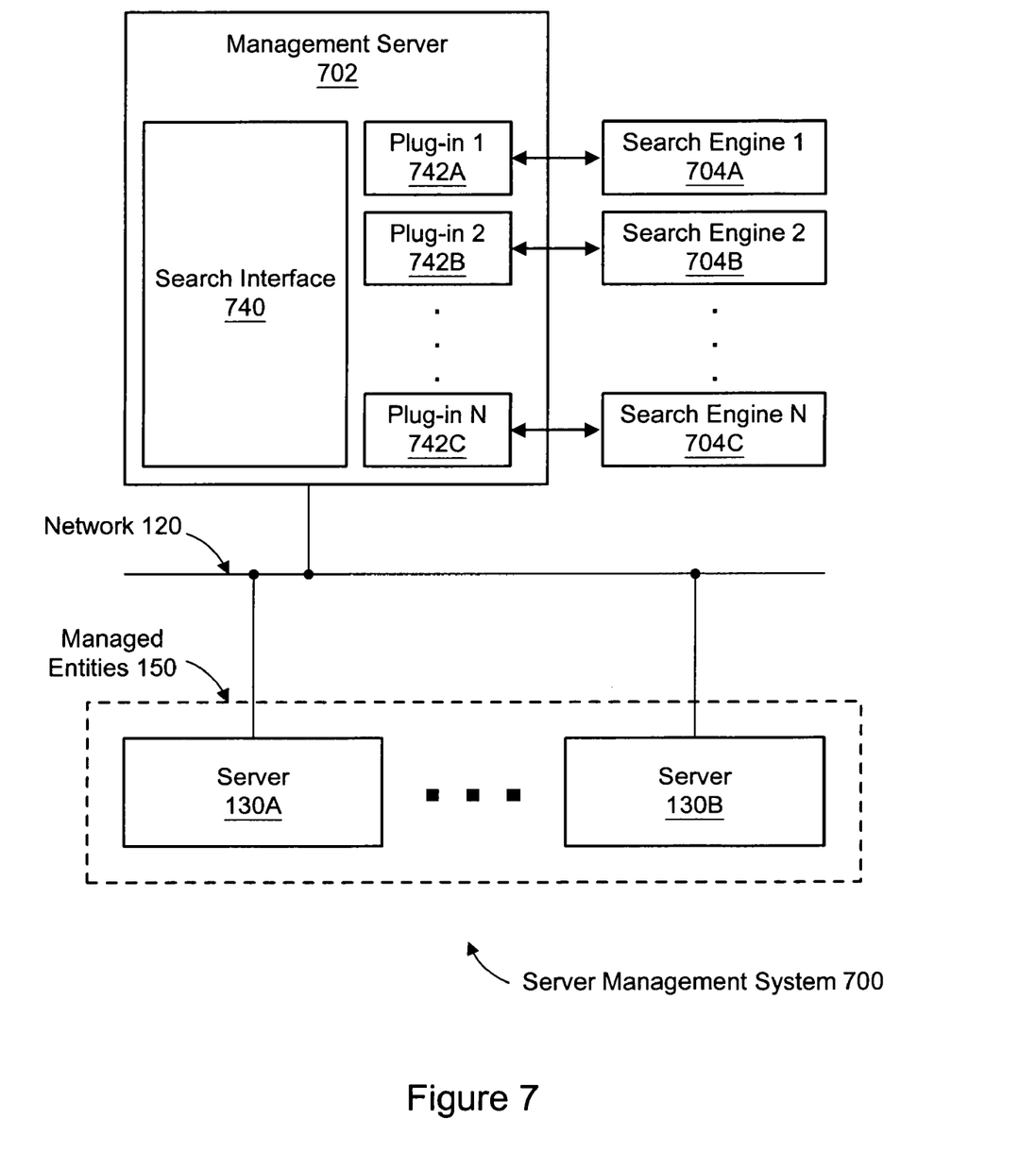
FIG. 7 illustrates a server management system including a search interface and a plurality of search engines according to one embodiment.

In one embodiment, the server management system may support a plurality of external search engines for tasks such as searching and index maintenance. FIG. 7 illustrates a server management system 700 including a search interface 740 and a plurality of search engines 704A, 704B, 704C (herein referred to collectively as search engines 704) according to one embodiment. As discussed above with reference to FIG. 6, various products may be used for the plurality of search engines 704. Each search engine 704 may provide its own user interface (i.e., its own "look and feel") to the management server 702. The search interface 740 may include a front end, such as a web browser, which is executed locally on the management server 702 to display one or more of the user interfaces provided by the various search engines 704. In this manner, the management server 702 may present the user with a choice of familiar user experiences from the plurality of search engines 704. As is discussed with reference to FIG. 6, each plug-in 742A, 742B, 742C (herein referred to collectively as plug-ins 742) may provide specific logic for using the corresponding search engine 704 to search the managed entities 150 in the server management system 700. In one embodiment, a plurality of searches may be conducted in parallel by using the a plurality of the plug-ins 742 to communicate with the respective search engines 704. The plurality of searches may be conducted in a substantially simultaneous manner using substantially the same search terms and parameters.

Figure 8:
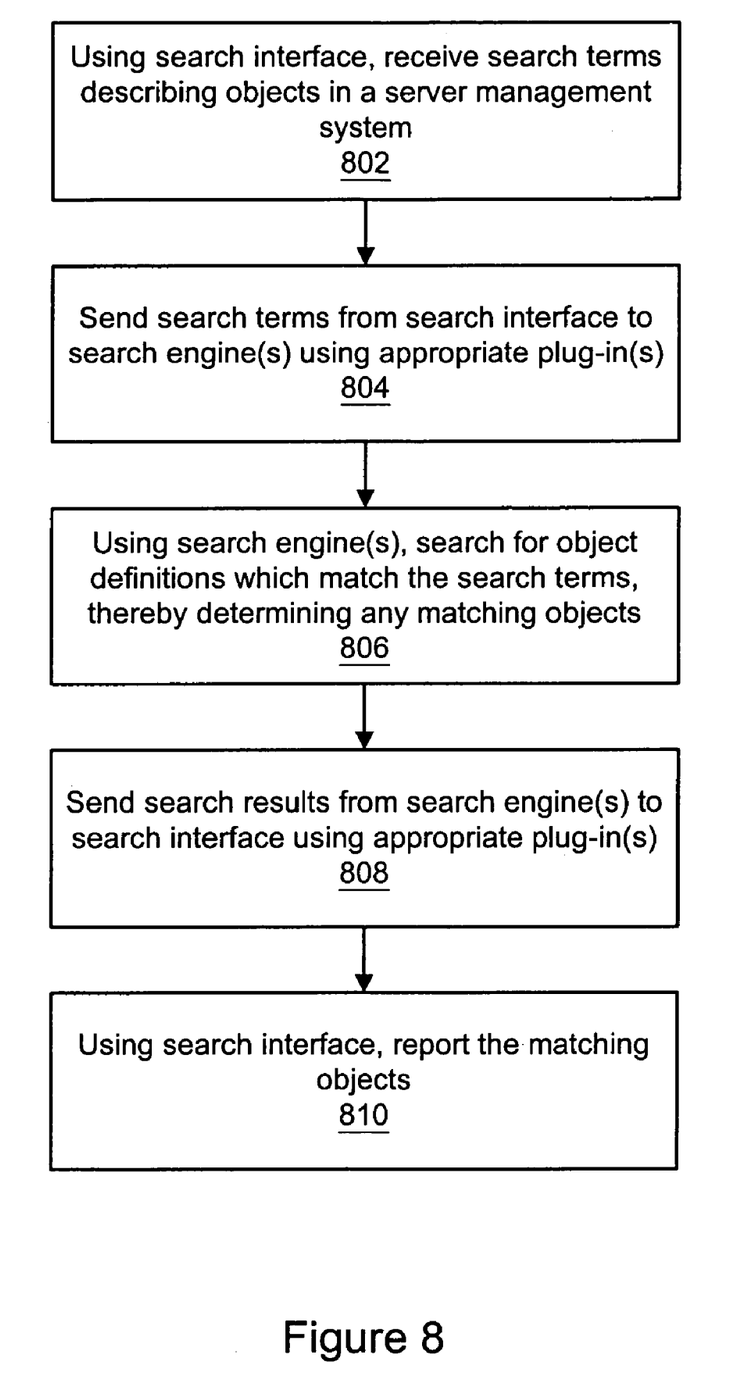
FIG. 8 is a flowchart illustrating a method for searching a server management system using an external search engine according to one embodiment.

FIG. 8 is a flowchart illustrating a method for searching a server management system using one or more external search engines according to one embodiment. Blocks that are implemented in software may represent a plurality of instructions comprising the software which, when executed on a suitable computer system, perform the function(s) described for the blocks. In 802, one or more search terms are received using a search interface. The generation and receipt of search terms is further discussed with reference to FIGS. 2-5. In 804, the one or more search terms are sent from the search interface to one or more search engines, wherein the one or more search engines are external to the search interface. As is discussed with reference to FIGS. 6 and 7, the search interface may use a server management search plug-in to communicate with each search engine. In 806, the one or more search engines are used to search for the object definitions which match the one or more search terms. In 808, the search results are sent from the one or more search engines to the search interface using the appropriate plug-in(s). In one embodiment, steps 804-808 may be conducted using a plurality of plug-ins and corresponding search engines in a parallel manner. In 810, the search interface is used to report the one or more matching objects, e.g., to the user or to the program requesting the search. The reporting of the search results is further discussed with reference to FIGS. 2 and 3.

Exemplary Computer Systems

Figure 9:
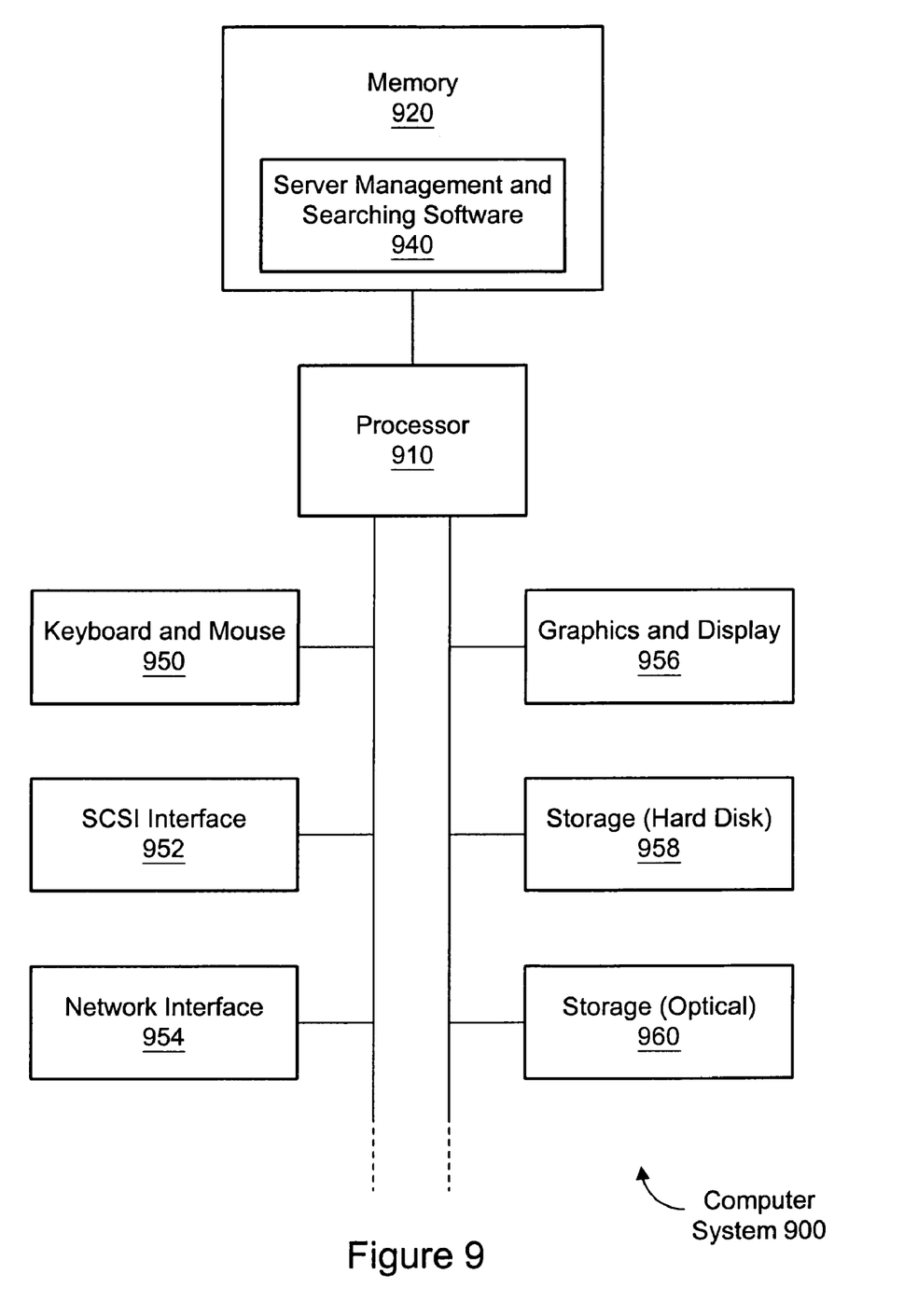
FIG. 9 illustrates a block diagram of a typical computer system for implementing embodiments of the systems and methods described above.

FIG. 9 illustrates a block diagram of a typical computer system 900 for implementing embodiments of the systems and methods described above for performing searches in a server management system. Computer system 900 may be illustrative of a management server 102, 602, 702; client 110; or server 130A, 130B. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., server management and searching software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the server management or searching functions or methods described above. Also, in some embodiments software 940 can be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method executed on a computer system comprising:
    Receiving one or more initial search terms describing one or more objects in a server management system;
    Automatically determining one or more suggested search terms in response to the receiving the one or more initial search terms;
    Displaying the one or more suggested search terms to the user;
    Receiving a user selection of a subset of the one or more suggested search terms;
    Searching for object definitions which match the one or more search terms;
    Determining one or more matching objects corresponding to the object definitions which match the one or more search terms; and
    Reporting the one or more matching objects, wherein reporting the one or more matching objects comprises reporting that a first matching object is defined in at least a first management context and a second management context, wherein the first management context relates to management of a first category of resources, and wherein the second management context relates to management of a second category of resources.

2. The method of claim 1, wherein the automatically determining the one or more suggested search terms comprises automatically determining the one or more suggested search terms based on the role of the user.

3. The method of claim 1, wherein the automatically determining the one or more suggested search terms comprises automatically determining the one or more suggested search terms based on a frequency of prior operations on specific objects.

4. The method of claim 1, wherein the automatically determining the one or more suggested search terms comprises automatically determining the one or more suggested search terms based on a frequency of prior operations on object types.

5. The method of claim 1, wherein the automatically determining the one or more suggested search terms comprises automatically determining the one or more suggested search terms based on a frequency of prior events on specific objects.

6. The method of claim 1, wherein the automatically determining the one or more suggested search terms comprises automatically determining the one or more suggested search terms based on a frequency of prior events on object types.

7. The method of claim 1, further comprising:
    selecting one of the matching objects in one of the management contexts, thereby determining a selected object and a selected management context; and
    performing an action on the selected object in the selected management context.

8. The method of claim 1, wherein the receiving the one or more search terms comprises:
    receiving the one or more search terms using a search interface; and
    sending the one or more search terms from the search interface to one or more search engines, wherein the one or more search engines are external to the search interface.

9. The method of claim 8, wherein the searching for the object definitions which match the one or more search terms comprises:
    using the one or more search engines to search for the object definitions which match the one or more search terms.

10. The method of claim 8, wherein the reporting the one or more matching objects comprises:
    using the search interface to report the one or more matching objects.

11. The method of claim 8,
    wherein the search interface uses one or more server management search plug-ins to communicate with the respective one or more search engines.

12. A computer-accessible storage medium comprising program instructions, wherein the program instructions are computer-executable to implement:
    Receiving one or more initial search terms describing one or more objects in a server management system;
    Automatically determining one or more suggested search terms in response to the receiving the one or more initial search terms;
    Displaying the one or more suggested search terms to the user;
    Receiving a user selection of a subset of the one or more suggested search terms;
    Searching for object definitions which match the one or more search terms;
    Determining one or more matching objects corresponding to the object definitions which match the one or more search terms; and Reporting the one or more matching objects, wherein reporting the one or more matching objects comprises reporting that a first matching object is defined in at least a first management context and a second management context, wherein the first management context relates to management of a first category of resources, and wherein the second management context relates to management of a second category of resources.

13. The computer-accessible storage medium of claim 12, wherein in the receiving the one or more search terms, the program instructions are computer-executable to implement:
receiving the one or more search terms using a search interface; and
sending the one or more search terms from the search interface to one or more search engines, wherein the one or more search engines are external to the search interface.

14. A server management system comprising:
A plurality of managed entities;
A management server comprising a processor and a memory, wherein the memory stores program instructions that are executable by the processor to receive one or more initial search terms describing one or more objects stored on the plurality of managed entities;
Automatically determine one or more suggested search terms in response to the receiving the one or more initial search terms;
Display the one or more suggested search terms to the user;
Receive a user selection of a subset of the one or more suggested search terms; and
a search engine, wherein the search engine is configured to search for object definitions which match the one or more search term and determine one or more matching objects corresponding to the object definitions which match the one or more search terms; and
Wherein the program instructions are further executable by the processor to report the one or more matching objects, wherein reporting the one or more matching objects comprises reporting that a first matching object is defined in at least a first management context and a second management context, wherein the first management context relates to management of a first category of resources, and wherein the second management context relates to management of a second category of resources.

15. The server management system of claim 14, further comprising:
one or more additional search engines;
wherein the management server comprises a search interface;
wherein the search engine and the one or more additional search engines are external to the management server;
wherein in receiving the one or more search terms, the program instructions are further executable by the processor to:
receive the one or more search terms using the search interface; and
send the one or more search terms to the search engine and the one or more additional search engines in parallel.

16. The method of claim 1,
wherein the first management context comprises a server management context;
wherein the first category of resources comprises a plurality of objects usable for server management;
wherein the second management context comprises a file system management context; and
wherein the second category of resources comprises a plurality of objects usable for file system management.

17. The method of claim 1,
wherein the first management context comprises a server management context;
wherein the first category of resources comprises a plurality of objects usable for server management;
wherein the second management context comprises a volume management context; and
wherein the second category of resources comprises a plurality of objects usable for volume management.

18. The method of claim 1,
wherein the first management context comprises a server management context;
wherein the first category of resources comprises a plurality of objects usable for server management;
wherein the second management context comprises a storage management context; and
wherein the second category of resources comprises a plurality of objects usable for storage management.

19. The method of claim 1,
wherein the first management context comprises a server management context;
wherein the first category of resources comprises a plurality of objects usable for server management;
wherein the second management context comprises a cluster management context; and
wherein the second category of resources comprises a plurality of objects usable for cluster management.

20. The method of claim 1, further comprising:
sorting the one or more matching objects by the respective management context of each of the matching objects.

21. The method of claim 1,
wherein receiving the one or more search terms comprises:
receiving the one or more search terms using a search interface;
wherein searching for the object definitions which match the one or more search terms comprises:
sending the one or more search terms from the search interface to a plurality of search engines, wherein the plurality of search engines are external to the search interface; and
using each of the plurality of search engines to search for the object definitions which match the one or more search terms.

* * * * *

UNITED STATES PATENT AND TRADEMARK OFFICE
CERTIFICATE OF CORRECTION

| | | |
|---|---|---|
| PATENT NO. | : 7,529,744 B1 | Page 1 of 1 |
| APPLICATION NO. | : 11/171952 | |
| DATED | : May 5, 2009 | |
| INVENTOR(S) | : Sharad Srivastava and Darshan B. Joshi | |

It is certified that error appears in the above-identified patent and that said Letters Patent is hereby corrected as shown below:

In the Claims:

Claim 1, col. 9, line 51, please change "Displaying the one or more suggested search terms to the" to "Displaying the one or more suggested search terms to a".

Signed and Sealed this

Tenth Day of November, 2009

David J. Kappos
*Director of the United States Patent and Trademark Office*